(12) United States Patent
Juni

(10) Patent No.: US 8,023,778 B2
(45) Date of Patent: Sep. 20, 2011

(54) OPTICAL TOUCH PANEL

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 187 days.

(21) Appl. No.: 12/473,373

(22) Filed: May 28, 2009

(65) Prior Publication Data

US 2010/0007622 A1 Jan. 14, 2010

(30) Foreign Application Priority Data

Jul. 10, 2008 (JP) .................................. 2008-180026

(51) Int. Cl.
*G06F 3/041* (2006.01)

(52) U.S. Cl. ............ 385/14; 385/131; 345/175; 345/176
(58) Field of Classification Search .................... 385/14, 385/33, 129–132; 345/173, 175, 176
See application file for complete search history.

(56) References Cited

U.S. PATENT DOCUMENTS

| 6,937,124 | B1 * | 8/2005 | Nakamura et al. | 335/222 |
| 6,992,659 | B2 * | 1/2006 | Gettemy | 345/173 |
| 7,520,050 | B2 * | 4/2009 | Graham | 29/825 |
| 7,786,983 | B2 * | 8/2010 | Graham | 345/175 |
| 2005/0271326 | A1 * | 12/2005 | Luo | 385/43 |
| 2006/0002655 | A1 * | 1/2006 | Smits | 385/31 |

FOREIGN PATENT DOCUMENTS

| JP | 11-232024 A | 8/1999 |
| JP | 2004-295644 A | 10/2004 |

* cited by examiner

*Primary Examiner* — Daniel Petkovsek
(74) *Attorney, Agent, or Firm* — Westerman, Hattori, Daniels & Adrian, LLP (57) ABSTRACT

An optical touch panel 10 has means 20 for generating a signal to provide an operator with input operational feeling. The center of a light-emitting sided-core 17 is positioned lower than the center of a light-emitting sided-optical waveguide 14 and the center of a light-receiving sided-core 19 is positioned lower than the center of a light-receiving sided-optical waveguide 15, thereby light beams 22 are situated close to a transparent panel 21, and this enables to obtain natural input operational feeling having a minimal time lag between input operation and a signal generation to provide input operational feeling.

7 Claims, 4 Drawing Sheets

OPTICAL TOUCH PANEL

BACKGROUND OF THE INVENTION

1. Field of the Invention

The present invention relates to an optical touch panel which enables coordinate inputting by a finger or a pen and includes a coordinate input region composed of a display screen, such as a liquid crystal panel or the like, and a light-emitting element, a light-receiving element, and an optical waveguide which are provided around the coordinate input region.

2. Description of Related Art

Optical touch panels are widely used for bank ATM systems or railway ticket-vending machines and the like because the display screens are clear and excellent in reliability compared with resistive touch panels and capacitance-type touch panels. Optical touch panels in which a large number of light-emitting diodes and phototransistors are arranged around a coordinate input region, are known (Japanese Unexamined Patent Publication No. 11-232024 A). Further, optical touch panels in which optical waveguides and microlenses are provided around the coordinate input region are known (Japanese Unexamined Patent Publication No. 2004-295644 A). Conventional optical touch panels have had, however, a problem with poor input operational feeling (click touch feeling), resulting in insufficient comfortableness in operation and certainty.

It is therefore an object of the present invention to provide an optical touch panel which can obtain natural input operational feeling (click touch feeling) and has operation certainty.

SUMMARY OF THE INVENTION

An optical touch panel of the present invention has means for generating a signal to provide an operator with input operational feeling. In addition, the center of a light-emitting core is positioned lower than the center of a light-emitting sided-optical waveguide and the center of a light-receiving core is positioned lower than the center of a light-receiving sided-optical waveguide. Accordingly, light beams that cross a coordinate input region are situated very close to a surface of the coordinate input region (a surface of a liquid crystal panel or a surface of a plasma panel). This enables to obtain natural input operational feeling having a minimal time lag between input operation and a signal generation to provide input operational feeling.

In the optical touch panel of the present invention, its frame is narrow, thin and light-weighted because optical waveguides are used instead of arranging an light-emitting diode and a phototransistor around the coordinate input region. Further, the optical touch panel of the present invention is easy to assemble and has superior impact resistance because of using optical waveguides with lens-integrated cladding layers without using a large number of optical parts, such as mirrors or lenses.

In a first preferred embodiment, an optical touch panel according to the present invention comprises: a coordinate input region; a light-emitting element; a light-receiving element; a light-emitting sided-optical waveguide connected to the light-emitting element and having an output end; and a light-receiving sided-optical waveguide connected to the light-receiving element and having an input end, wherein the output end of the light-emitting sided-optical waveguide and the input end of the light-receiving sided-optical waveguide are located on opposite sides of the coordinate input region, and the light-emitting sided-optical waveguide comprises a light-emitting sided-cladding layer; and a light-emitting sided-core embedded in the light-emitting sided-cladding layer, and the light-receiving sided-optical waveguide comprises a light-receiving sided-cladding layer; and a light-receiving sided-core embedded in the light-receiving sided-cladding layer; the light-emitting sided-cladding layer has a lower refractive index than the light-emitting sided-core and the light-receiving sided-cladding layer has a lower refractive index than the light-receiving sided-core, the center height of the light-emitting sided-core is lower than that of the light-emitting sided-optical waveguide and the center height of the light-receiving sided-cores is lower than that of the light-receiving sided-optical waveguide; and has means for generating a signal to provide input operational feeling using a detection signal received from the light-receiving element as a result of coordinate inputting.

In a second preferred embodiment of the optical touch panel according to the present invention, cladding layers of a light-emitting sided-optical waveguide and a light-receiving sided-optical waveguide each have an under-cladding layer and an over-cladding layer; and the over-cladding layer of the light-emitting sided-optical waveguide has an output end and the over-cladding layer of the light-receiving sided-optical waveguide has an input end; and at least one of the output end of the over-cladding layer and the input end of the over-cladding layer has a lens shape.

In a third preferred embodiment of the optical touch panel according to the present invention, the lens-shaped portion of the output end of the over-cladding layer of the light-emitting sided-optical waveguide and the lens-shaped portion of the input end of the over-cladding layer of the light-receiving sided-optical waveguide are each a long lens having a side sectional shape of substantially a quarter of a circle.

In a fourth preferred embodiment of the optical touch panel according to the present invention, means for generating a signal comprises means for generating vibration.

ADVANTAGES OF THE INVENTION

An optical touch panel of the present invention has means for generating a signal to provide an operator with input operational feeling. In the optical touch panel of the present invention, the center of a light-emitting sided-core is positioned lower than the center of a light-emitting sided-optical waveguide and the center of a light-receiving core is positioned lower than the center of a light-receiving sided-optical waveguide. Accordingly, light beams that cross a coordinate input region are situated very close to the surface of the coordinate input region (a surface of a liquid crystal panel or a surface of a plasma panel). This enables to obtain natural input operational feeling having a minimal time lag between input operation and a signal generation to provide input operational feeling. A light-receiving element sends a detection signal when part of light beams is blocked by a finger or a pen. Upon receiving the detection signal, the means for generating a signal generates a signal, such as light or a signal sound or vibration and the like. Since the finger or the pen generally comes into contact with the coordinate input region when inputting, the operator can obtain natural input operational feeling (click touch feeling) because vibration is propagated to the finger or the pen.

In the optical touch panel of the present invention, its frame is narrow, thin and light-weighted because optical waveguides are used instead of arranging a light-emitting diode and a phototransistor around the coordinate input region. Further, the optical touch panel of the present invention is easy to assemble and has superior impact resistance because of using optical waveguides with lens-integrated cladding layers without using a large number of optical parts, such as mirrors or lenses.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-8 of the drawings. Identical elements in the various figures are designated with the same reference numerals.

[Optical Touch Panel]

Figure 1:
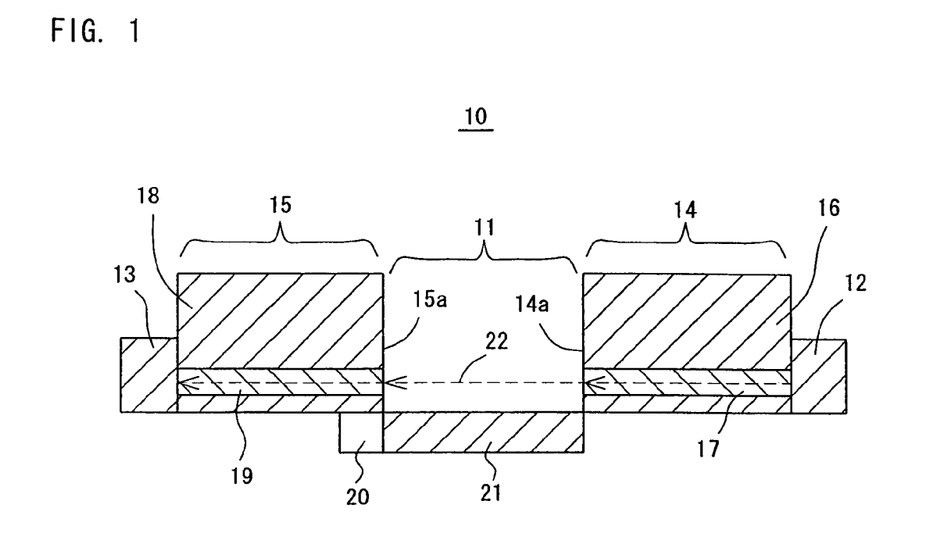
FIG. 1 is a sectional view of a main part of an optical touch panel of the present invention.

As shown in FIG. 1 (sectional view), an optical touch panel 10 of the present invention comprises: a coordinate input region 11; a light-emitting element 12; a light-receiving element 13; a light-emitting sided-optical waveguide 14 connected to the light-emitting element 12; and a light-receiving sided-optical waveguide 15 connected to the light-receiving element 13. The light-emitting sided-optical waveguide 14 has an output end portion 14a (hereinafter, also referred to as a "distal end portion 14a") and the light-receiving sided-optical waveguide 15 has an input end portion 15a (hereinafter, also referred to as a "distal end potion 15a"). The output end portion 14a and the input end portion 15a are located on the opposite sides of the coordinate input region 11. The light-emitting sided-optical waveguide 14 has a light-emitting sided-cladding layer 16 and a light-emitting sided-core 17 embedded in the light-emitting sided-cladding layer 16. The light-receiving sided-optical waveguide 15 has a light-receiving cladding layer 18 and a light-receiving sided-core 19 embedded in the light-receiving sided-cladding layer 18. The light-emitting sided-cladding layer 16 has a lower refractive index than the light-emitting sided-core 17. The light-receiving sided-cladding layer 18 has a lower refractive index than the light-receiving sided-core 19. The center height (L in FIG. 3) of the light-emitting sided-core 17 is lower than the center height (H in FIG. 3) of the light-emitting sided-optical waveguide 14. The center height (L in FIG. 3) of the light-receiving sided-core 19 is lower than the center height (H in FIG. 3) of the light-receiving sided-optical waveguide 15. More specifically, the coordinate input region 11 is a display screen, such as a liquid crystal panel or a plasma panel or the like (A transparent panel 21 is provided on a surface). The optical touch panel 10 of the present invention includes means 20 for generating a signal to provide input operational feeling using a detection signal received from the light-receiving element 13. The means 20 for generating a signal is preferably connected to the transparent panel 21 provided on the surface of the coordinate input region 11. The means 20 for generating a signal preferably vibrates the transparent panel 21 simultaneously with the emission of a signal sound or light.

In the optical touch panel 10 of the present invention, light beams 22 (dotted lines) emitted from the light-emitting element 12 pass through the light-emitting sided-core 17, emanate therefrom through the distal end portion, cross the coordinate input region 11, are incident on the light-receiving sided-core 19 through the distal end portion, pass through the light-receiving sided-core 19, and reach the light-receiving element 13. When part of the light beams 22 crossing the coordinate input region 11 is blocked by a finger or a pen, the intensity of the light beams 22 received by the light-receiving element 13 is reduced. By detecting such a reduction in light intensity, it is possible to determine the coordinates of the position of the finger or pen.

The optical touch panel 10 of the present invention includes means 20 for generating a signal to provide input operational feeling. In addition to that, the center height of the light-emitting sided-core 17 is lower than the center height of the light-emitting sided-optical waveguide 14 and the center height of the light-receiving sided-core 19 is lower than the center height of the light-receiving sided-optical waveguide 15. Accordingly, light beams that cross the coordinate input region are situated very close to the surface of the coordinate input region (a surface of a liquid crystal panel or the plasma panel or a transparent panel). This enables to obtain natural input operational feeling having a minimal time lag between input operation and a signal generation to provide input operational feeling.

Figure 2:
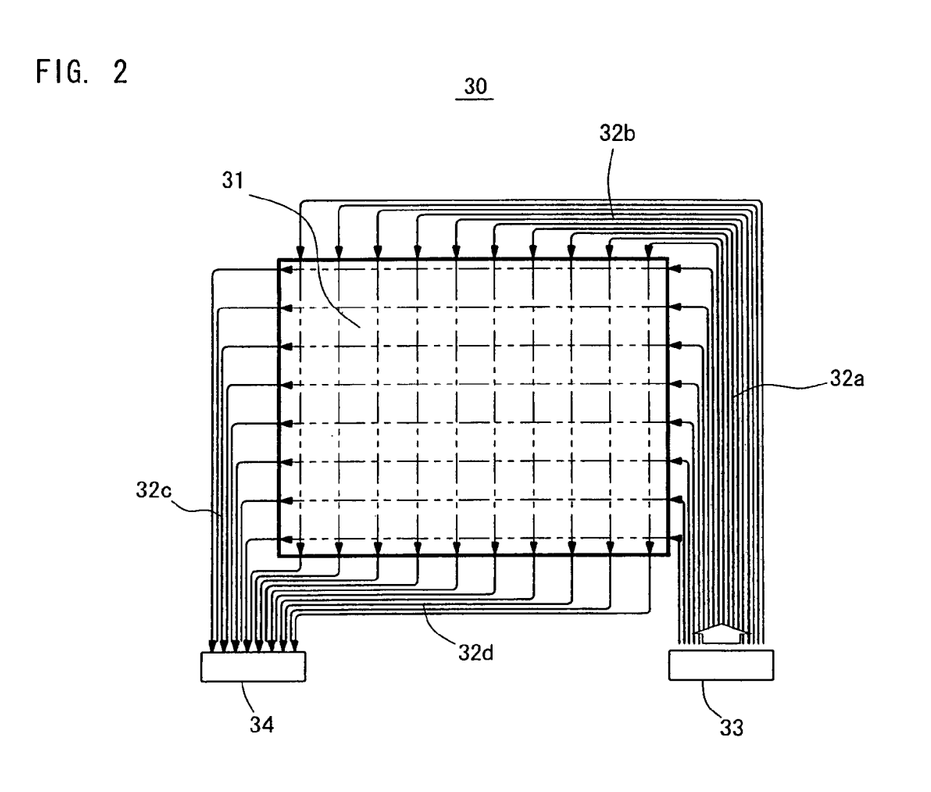
FIG. 2 is a plan view of the main part of the optical touch panel of the present invention.

As shown in FIG. 2 (plan view), an optical touch panel 30 of a preferred embodiment of the present invention has optical waveguides 32a, 32b, 32c, and 32d provided around a rectangular coordinate input region 31. More specifically, the light-emitting sided-optical waveguides 32a and 32b provided along adjacent two sides of the coordinate input region 31 are connected to a light-emitting element 33 at their proximal ends, and the light-receiving sided-optical waveguides 32c and 32d provided along the other adjacent two sides of the coordinate input region 31 are connected to a light-receiving element 34 at their proximal ends. Such a structure allows the optical touch panel 30 of the present invention to detect two-dimensional coordinates. In the optical touch panel 30 of the present invention, its frame is narrow, thin and light-weighted because optical waveguides 32a, 32b. 32c, and 32d are used instead of arranging a light-emitting diode and a phototransistor around the coordinate input region. Furthermore, the center height of the light-emitting sided-core is lower than the center height of the light-emitting sided-optical waveguide and the center height of the light-receiving sided-core is lower than the center height of the light-receiving sided-optical waveguide, which makes it possible to more securely recognize the coordinates.

[Coordinate Input Region]

In the present invention, the word "coordinate input region" refers to a region for performing a coordinate input by a finger or a pen. The coordinate input region is typified by, for example, a display screen such as a liquid crystal panel or a plasma panel. The coordinate input region of the optical touch panel of the present invention has no sensors because an optical waveguide, a light-emitting element, and a light-receiving element to be provided around the coordinate input region function as sensors. Unlike resistive touch panels and capacitance-type touch panels, the coordinate input region of the optical touch panel of the present invention does not need to have an overlay layer, such as an ITO film, serving as a sensor. Since the coordinate input region of the optical touch panel of the present invention does not have an overlay layer, brightness and sharpness of a liquid crystal panel or a plasma panel are not impaired. Therefore, an open space may be provided in front of the coordinate input region. Alternatively, a glass panel or an acrylic plate may be provided on the surface of the coordinate input region to improve scratch resistance. The transparent panel preferably has a thickness of 10 μm to 5 mm.

[Optical Waveguide]

As shown in FIG. 1, the light-emitting sided-optical waveguide 14 of the present invention comprises: a light-emitting sided-cladding layer 16; a light-emitting sided-core 17 embedded in the light-emitting sided-cladding layer 16. The light-receiving sided-optical waveguide 15 comprises: the light-receiving sided-cladding layer 18; and the light-receiving sided-core 19 embedded in the light-receiving sided-cladding layer 18.

The light-emitting sided-core 17 and the light-receiving sided-core 19 to be used in the present invention are each made of a material having high transparency at a wavelength of light that propagates with a higher refractive index than the light-emitting sided-cladding layer 16 and the light-receiving sided-cladding layer 18. The material for forming the light-emitting sided-core 17 and the light-receiving sided-core 19 is preferably a UV curable resin having excellent patterning properties. Preferred examples of such a UV curable resin include UV curable acrylic resins, UV curable epoxy resins, UV curable siloxane resins, UV curable norbornene resins, and UV curable polyimide resins or the like.

The refractive index of the light-emitting sided-cladding layer 16 is lower than that of the light-emitting sided-core 17. The refractive index of the light-receiving sided-cladding layer 18 is lower than that of the light-receiving sided-core 19. The maximum difference in refractive index between the light-emitting sided-core 17 and the light-emitting sided-cladding layer 16 is preferably 0.01 or more, more preferably 0.02 to 0.2. The maximum difference in refractive index between the light-receiving sided-core 19 and the light-receiving sided-cladding layer 18 is preferably 0.01 or more, more preferably 0.02 to 0.2. The refractive index of a resin for forming the light-emitting sided-core 17, the light-receiving sided-core 19, the light-emitting sided-cladding layer 16 or the light-receiving sided-cladding layer 18 can be increased or decreased by introducing an organic group appropriately selected into the resin or changing the organic group content of the resin. For example, the refractive index of the resin can be increased by, for example, introducing a cyclic aromatic group (e.g., a phenyl group) into a resin molecule or increasing a cyclic aromatic group content per resin molecule. On the other hand, the refractive index of the resin can be decreased by, for example, introducing a linear or cyclic aliphatic group (e.g., a methyl group or a norbornene group) into a resin molecule or increasing a linear or cyclic aliphatic group content per resin molecule.

The cross-sectional shape of each of the light-emitting sided core and the light-receiving sided-core is not particularly limited, but is preferably trapezoidal or rectangular from the viewpoint of patterning properties. The width of the base of each of the light-emitting sided-core and the light-receiving sided-core is preferably 10 to 500 μm. The height of each of the light-emitting sided-core and the light-receiving sided-core is preferably 10 to 100 μm.

Figure 3:
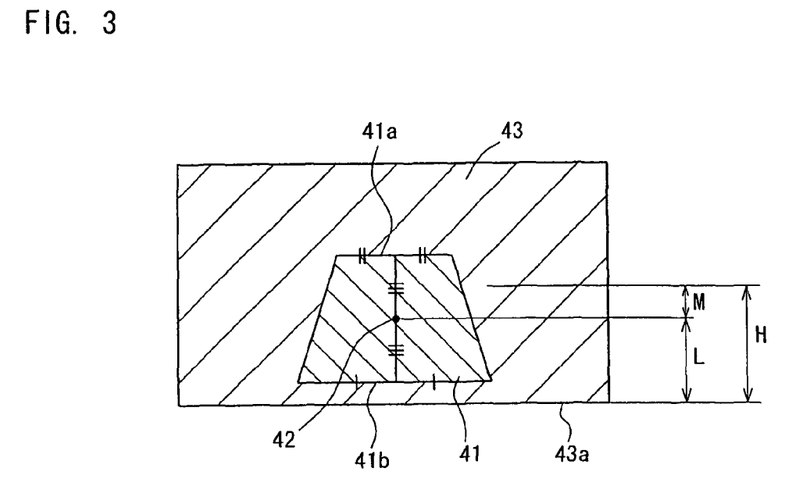
FIG. 3 is a sectional view of an optical waveguide.

The center height of the light-emitting sided-core is lower than that of the light-emitting sided-optical waveguide. The center height of the light-receiving sided-core is lower than that of the light-receiving sided-optical waveguide. The term "the center of core" herein described means a linear midpoint 42 to connect the midpoint of an upper base 41a of a core 41 and a lower base 41b as shown in FIG. 3 (cross-sectional diagram). Height L of the center 42 in the core 41 and center height H of an optical waveguide 43 are a distance from a lower base 43a of the optical waveguide 43.

The center height H of the light-emitting sided-optical waveguide and the light-receiving sided-waveguide is preferably 50 μm to 40 mm, more preferably 100 μm to 20 mm. The center height L of the light-emitting sided-core and the light-receiving sided-core is preferably 5 μm to 400 μm, more preferably 15 μm to 300 μm. Further, distance M from the center of the light-emitting sided-core to the center of the light-emitting sided-optical waveguide and distance M from the center of the light-receiving sided-core to the center of the light-receiving sided-optical waveguide are each preferably 20 μm to 5 mm, more preferably 30 μm to 1 mm.

In the optical touch panel of the present invention, the center height L of the light-emitting sided-core and the light-receiving sided-core is low, so that light beams that cross the coordinate input region are situated very close to the surface of the coordinate input region compared with the size of the finger or the pen. Principally, an input can be done only by blocking light beams that cross the surface of the coordinate input region without requiring the finger or the pen to come into contact with the coordinate input region. However, the finger or the pen comes into contact with the coordinate input region in many cases when inputting because light beams substantially cross very close to the coordinate input region.

A light-receiving element sends a detection signal when part of light beams is blocked by a finger or a pen. Upon receiving the detection signal, the means for generating a signal generates a signal, such as an optical signal, a sound signal, a voice signal or a vibration signal and the like. Since the finger or the pen generally comes into contact with the coordinate input region when inputting, the operator can obtain natural input operational feeling (click touch feeling) because vibration is propagated to the finger or the pen. Since it is not until when the finger or the pen comes so near to come into contact with the coordinate input region that an input is done. Accordingly, there is a minimal time lag between the coordinate input and the generation of a signal, such as a signal sound or a vibration signal and the like.

When the center of the light-emitting sided-core and the light-receiving sided-core is positioned too close to the bottom surface of the light-emitting sided-optical waveguide and the light-receiving sided-optical waveguide (L is less than 5 μm), the light beams that cross the coordinate input region are situated too close to the coordinate input region. Accordingly, dirt or water drops attached to the surface of the coordinate input region may be a cause of malfunction. On the contrary, when the center of the light-emitting sided-core and the light-receiving sided-core is too far away from the bottom surface of the light-emitting sided-optical waveguide and the light-receiving sided-optical waveguide (L is over 400 μm), there is a possibility that coordinate inputting is finished before the finger or the pen comes into contact with the coordinate input region, resulting in difficulty in obtaining natural input operational feeling (click touch feeling).

Figure 4:
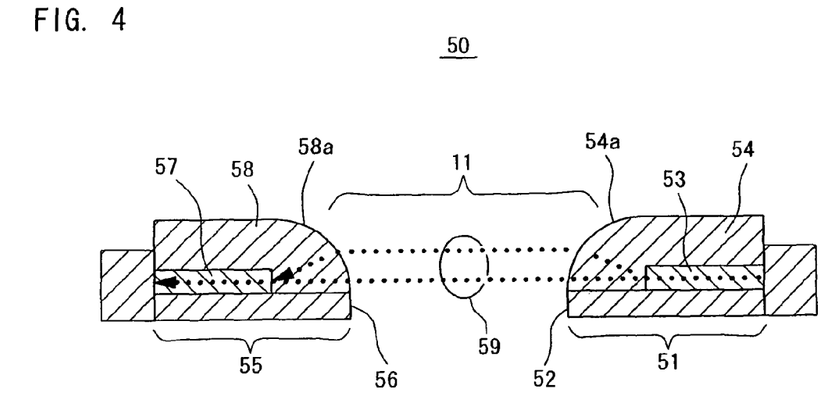
FIG. 4 is a sectional view of a main part of an optical touch panel of the present invention.

As shown in FIG. 4, a light-emitting sided-optical waveguide 51 to be used for an optical touch panel 50 of the present invention preferably has a light-emitting sided-under-cladding layer 52, a light-emitting sided-core 53 provided on the light-emitting sided-under-cladding layer 52, and a light-emitting-sided over-cladding layer 54 to cover the light-emitting sided-core 53 and the light-emitting sided-under-cladding layer 52. A light-receiving sided-optical waveguide 55 preferably has a light-receiving sided-under-cladding layer 56, a light-receiving sided-core 57 provided on the light-receiving sided-under-cladding layer 56, and a light-receiving sided-over-cladding layer 58 to cover the light-receiving sided-core 57 and the light-receiving sided-under-cladding layer 56. At least one of the distal end portions of the light-emitting sided-over-cladding layer 54 and the light-receiving sided-over-cladding layer 58 has a lens-shaped distal end portion.

The material for forming the light-emitting sided-over-cladding layer 54 and the light-receiving sided-over-cladding layer 58 is not particularly limited, but is preferably a UV curable resin having excellent lens formability. Respective lens-shaped distal end portions 54a and 58a of the light-emitting sided-over-cladding layer 54 and the light-receiving sided-over-cladding layer 58 are not particularly limited, but are preferably a convex lens, more preferably, as shown in FIG. 4, are a long convex lens having a side sectional shape of substantially a quarter of a circle (which corresponds to a semi-lenticular lens). The curvature radius of the lens is preferably 0.3 to 5 mm, more preferably 0.5 to 3 mm.

The lens-shaped portion 54a of the distal end portion of the light-emitting sided-over-cladding layer 54 has a function to convert light with a divergence angle emitted from the distal end portion of the light-emitting-sided core 53 into parallel beams 59. And the lens-shaped portion 58a of the distal end portion of the light-receiving sided-over-cladding layer 58 has a function to convert the parallel beams 59 incident on the distal end portion of the light-receiving sided-core 57 into convergent beams.

The light-emitting sided-under-cladding layer 52 and the light-emitting sided-over cladding layer 54 are made of a material having a lower refractive index than the light-emitting sided-core 53. Moreover, the light-receiving sided-under-cladding layer 56 and the light-receiving-sided-over-cladding layer 58 are each made of a material having a lower refractive index than the light-receiving sided-core 57. The material of the light-emitting sided-under-cladding layer 52 and the light-receiving sided-under-cladding layer 56 is not particularly limited, but preferred examples thereof include glass, silicon, metals or resins. The light-emitting sided-under-cladding layer 52 and the light-emitting sided-over-cladding layer 54 are preferably made of the same material. The light-receiving sided-under-cladding layer 56 and the light-receiving sided-over-cladding layer 58 are preferably made of the same material. The light-emitting sided-under-cladding layer 52 and the light-receiving sided-under-cladding layer 56 may be constituted from a single layer or multiple layers. A glass panel to be used for manufacturing a liquid crystal panel or a plasma panel and an optical film may be used as the light-emitting sided-under-cladding layer 52 and the light-receiving sided-under-cladding layer 56. The thickness of the light-emitting sided-under-cladding layer 52 and the light-receiving sided-under-cladding layer 56 is preferably 5 µm to 10 mm, more preferably 20 µm to 5 mm. The thickness of the light-emitting sided-over cladding layer 54 and the light-receiving sided-over-cladding layer 58 is preferably 10 µm to 10 mm, more preferably 50 µm to 5 mm.

[Light-Emitting Element and Light-Receiving Element]

A touch panel of the present invention comprises a light-emitting element and a light-receiving element. A light-emitting sided-optical waveguide is connected to the light-emitting element at the proximal end of the light-emitting sided core. The light-emitting element is preferably a light-emitting diode or a semi-conductor laser, more preferably a Vertical Cavity Surface Emitting Laser (VCSEL). A VCSEL is excellent in light transmission because the VCSEL can emanate laser light in a vertical direction on the substrate surface by resonating light in the vertical direction of the substrate surface. The wavelength of light emitted from the light-emitting element is preferably any one of a near-infrared area (700 nm to 2,500 nm).

The light-receiving sided-optical waveguide is connected to the light-receiving element at the proximal end of the light-receiving sided-core. The light-receiving element is an element to convert an optical signal into an electric signal, preferably a light-receiving element of a one-dimensional array, more preferably a Complementary Metal-Oxide Semiconductor (CMOS) image sensor or a Charge Coupled Device (CCD) image sensor.

[Means for Generating a Signal to Provide Input Operational Feeling]

Figure 5:
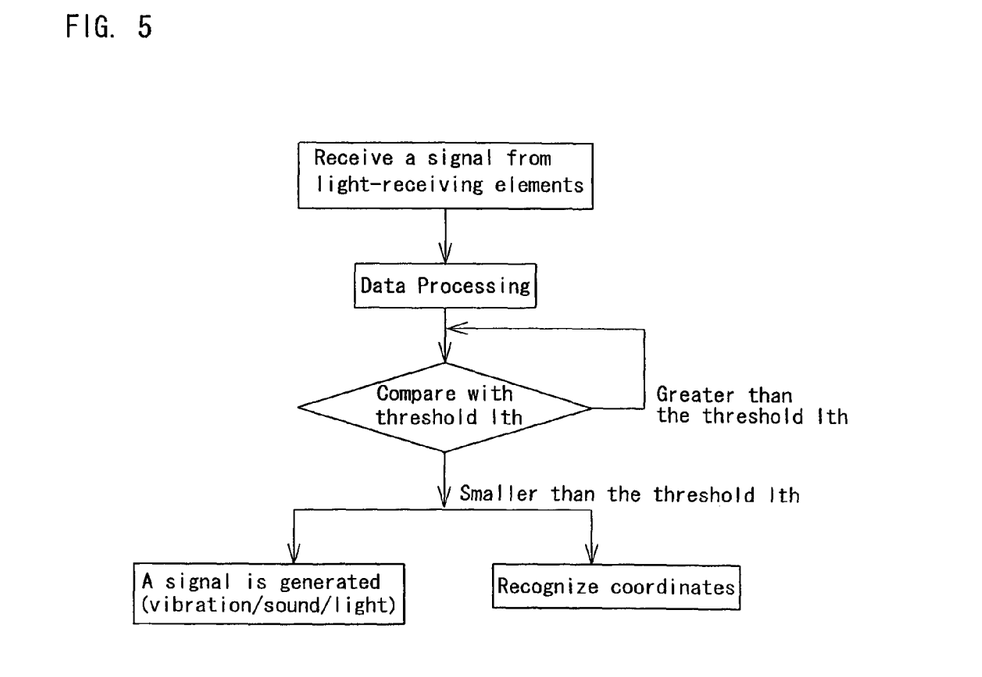
FIG. 5 is a signal processing flow chart of an optical touch panel of the present invention.
Figure 6:
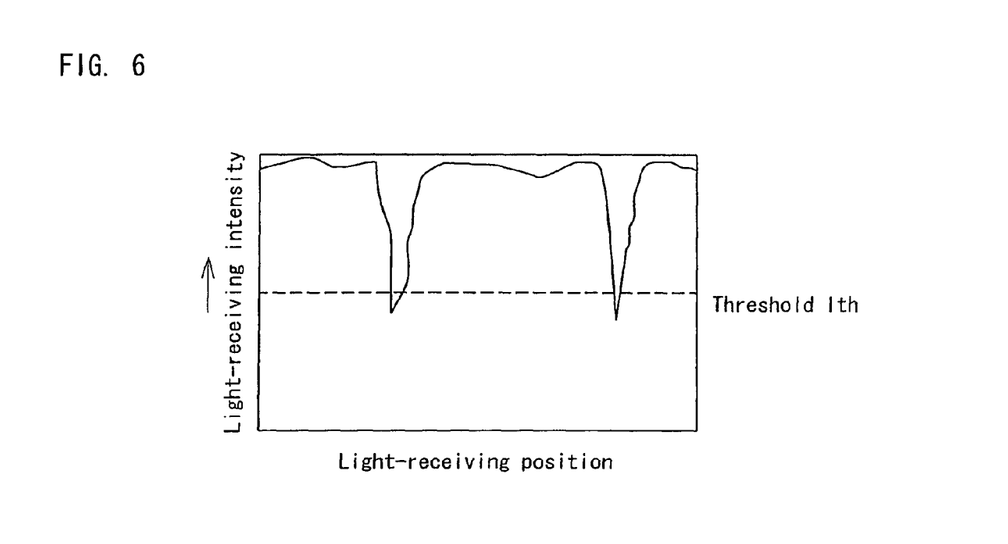
FIG. 6 is a diagram for explaining the threshold of light-receiving intensity.

The Means for generating a signal to be used for the optical touch panel of the present invention generates a signal to provide the operator with input operational feeling by a signal sent from the light-receiving element. FIG. 5 is a general flow sheet. The means for generating a signal performs data processing, such as normalizing a signal preferably obtained from the light-receiving element or the like and as shown in FIG. 6, the means for generating a signal generates a signal to provide input operational feeling with respect to the signal lower than a threshold Ith previously set. The inputted coordinates are recognized at the same time. The aforementioned threshold Ith is preferably set at 0.4 to 0.8 when the normalized signal intensity is 1. In addition to the aforementioned optical waveguide, the optical touch panel of the present invention provides more secured and natural operational feeling by performing such data processing.

Any means for providing the operator with input operational feeling, such as a light-emitting diode, a speaker for making a sound and a voice or a vibration actuator to generate vibration may be used for the means for generating a signal.

Figure 7:
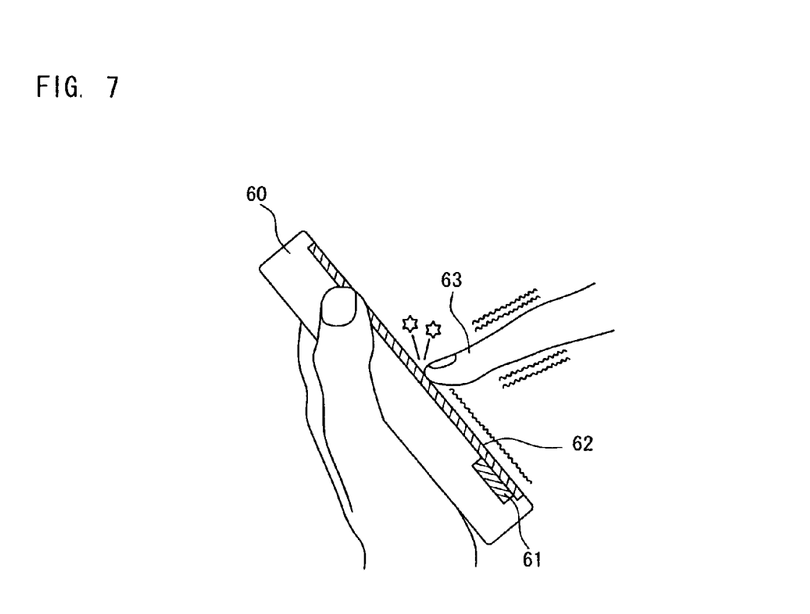
FIG. 7 is a diagram for explaining means for generating vibration.

The means for generating a signal is preferably means for generating vibration. The means for generating vibration is capable of securely providing the operator with input operational feeling even in any noisy environments. The means for generating vibration is not particularly limited, but examples thereof preferably include a vibration motor, a vibration actuator or a piezo element and the like. In the case of using means for generating vibration, as shown in FIG. 1, the transparent panel 21 is provided on the surface of the coordinate input region 11, and the means 20 for generating a signal (vibration) is provided on the ends or the lower portion of the transparent panel 21. As shown in FIG. 7, such an optical touch panel 60 can propagate to a fingertip 63 vibration made by means 61 for generating vibration via a transparent panel 62.

[Method for Manufacturing Optical Touch Panel]

Figure 8:
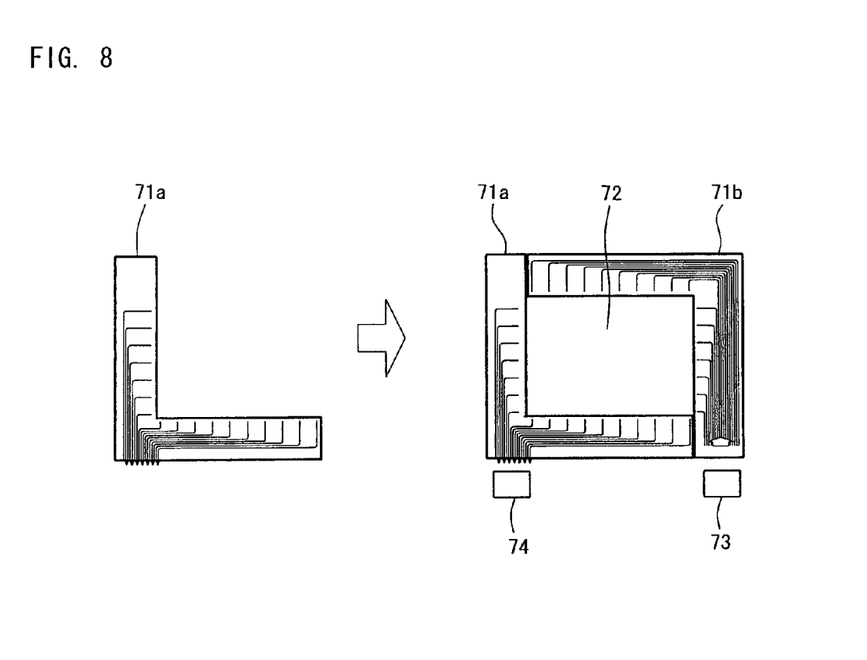
FIG. 8 is a diagram for explaining a method for manufacturing the optical touch panel of the present invention.

The optical touch panel of the present invention can be manufactured by, for example, the following method. As shown in FIG. 8, two L-shaped optical waveguides 71a and 71b are first formed. Then, these two L-shaped optical waveguides 71a and 71b are arranged on the opposite sides of a coordinate input region 72. Then, one of the optical waveguides, that is, the optical waveguide 71b is connected to a light-emitting element 73 at the proximal end of its core, and the other optical waveguide, that is, the optical waveguide 71a is connected to a light-receiving element 74 at the proximal end of its core. According to such a manufacturing method, by forming optical waveguides by an exposure and development method, it is possible to manufacture an optical touch panel having a large area using a photo mask having a relatively small area.

A method for manufacturing the optical touch panel of the present invention is not limited to the above-described method in which L-shaped optical waveguides are assembled. For example, the optical touch panel of the present invention may be manufactured by assembling four I-shaped optical waveguides or using a frame-shaped optical waveguide requiring no assembly.

[Applications]

While the application of the optical touch panel of the present invention is not particularly limited, examples of the application of the optical touch panel of the present invention include bank ATM systems, railway ticket-vending machines, search terminals in libraries, shop POS systems, operation panels of copiers and production facilities, electronic notepads, game machines, mobile phones, car navigation systems, and PC input systems or the like.

EXAMPLES

[Preparation of Varnish for Forming Cladding]

A varnish for forming cladding was prepared by mixing 35 parts by weight of bisphenoxyethanolfluorene glycidyl ether (component A), 40 parts by weight of an alicyclic epoxy resin (CELLOXIDE 2021P manufactured by Daicel Chemical Industries, Ltd.) (component B), 20 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di($\beta$-hydroxyethoxy)phenylsulfinio]phenylsulfide-bis-hexafluoroantimonate (component D).

[Preparation of Varnish for Forming Cores]

A varnish for forming cores was prepared by mixing 70 parts by weight of the component A, 30 parts by weight of 1,3,3-tris(4-(2-(3-oxetanyl)butoxyphenyl)butane, 1 part by weight of the component D, and 35 parts by weight of ethyl lactate.

[Formation of Optical Waveguide]

The varnish for forming cladding was applied onto the surface of a polyethylene naphthalate film having a thickness of 188 μm, irradiated with UV light at 2,000 mJ/cm², and thermally-treated at 100° C. for 15 minutes to form an under-cladding layer having a thickness of 20 μm. The refractive index of the under-cladding layer as measured at a wavelength of 830 nm was 1.542.

The varnish for forming cores was applied onto the surface of the under-cladding layer and thermally-treated at 100° C. for 15 minutes to form a core layer. Then, the core layer was covered with a photo mask, irradiated with UV light at 4,000 mJ/cm², and thermally-treated at 80° C. for 15 minutes. Patterning of the core layer was performed by dissolving away an unexposed portion of the core layer using an aqueous γ-butyrolactone solution and thermally treating the core layer at 120° C. for 30 minutes so that an L-shaped optical waveguide shown in FIG. 8 having cores each having a width of 15 μm and a height of 50 μm was obtained. The refractive index of each of the cores as measured at a wavelength of 830 nm was 1.588.

Then, a quartz molding die was placed on the surface of the under-cladding layer so as to cover the entire cores, and the varnish for forming cladding was injected into the molding die. The varnish for forming cladding was irradiated with UV light at 2,000 mJ/cm² through the molding die and thermally-treated at 120° C. for 30 minutes to form an over-cladding layer with a thickness of 1 mm equipped with a long convex lens having a side sectional shape of a substantially quarter of a circle (i.e., a shape corresponding to a semi-lenticular lens) at its distal end. In this way, a light-emitting sided-L-shaped optical waveguide and a light-receiving sided-L-shaped optical waveguide were formed. The convex lens had a radius of curvature of 1.5 mm. The refractive index of the over-cladding layer as measured at a wavelength of 830 nm was 1.542.

The height (thickness) of the optical waveguide is: the under-cladding layer 20 μm+the over-cladding layer w 1,000 μm=1,020 μm. Accordingly, the center of the optical waveguide is positioned upward 510 μm from the base of the optical waveguide (H=510 μm). The distance L from the base of the optical waveguide to the core center was the under-cladding layer 20 μm+core 50 μm×0.5=45 μm. Therefore, distance M from the core center from the center of the optical waveguide was 465 μm (510 μm−45 μm). These dimensions were measured by an electronics microscope and a microscope.

[Preparation of Optical Touch Panel]

A VCSEL (manufactured by Optwell) emitting light having a wavelength of 850 nm was connected as a light-emitting element to one end of the light-emitting sided-L-shaped optical waveguide using a UV curable adhesive. On the other hand, a CMOS linear sensor array (manufactured by TAOS) was connected as a light-receiving element to one end of the light-receiving sided-L-shaped optical waveguide using a UV curable adhesive. In this way, an optical touch panel having a diagonal size of 3 inches was prepared.

The optical waveguide module, a vibration motor as means for generating vibration, and a Red Light emitting diode were connected to a driving part and a control unit via a flexible printed board to prepare an optical touch panel. To evaluate an optical touch panel, a control unit of the light-receiving element of the optical touch panel was connected to a USB data acquisition unit (manufactured by National Instruments Corporation) through a flexible printed circuit board, and the USB data acquisition unit was connected to a computer through a USB port.

[Evaluation]

Light having a wavelength of 850 nm and an intensity of 2 mW was emitted from the light-emitting element of the optical touch panel. The light passed through the light-emitting sided-optical waveguide, was emitted therefrom through its output end, crossed the coordinate input region in a lattice pattern, was incident on the light-receiving sided-optical waveguide through its input end, passed through the light-receiving sided-optical waveguide, and reached the light-receiving element. The light intensity distribution data was shown in normalized to set threshold at 0.65. When part of light was blocked by touching the coordinate input region of the optical touch panel with a finger, the XY coordinates of the position touched by the finger was recognized and vibration generation of the vibration motor and emission of the Red Light emitting diode were observed.

This application claims priority from Japanese Patent Application No. 2008-180026, which is incorporated herein by reference.

There have thus been shown and described a novel optical touch panel which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical touch panel comprising:
a coordinate input region;
a light-emitting element;
a light-receiving element;
a light-emitting sided-optical waveguide connected to the light-emitting element and having an output end; and
a light-receiving sided-optical waveguide connected to the light-receiving element and having an input end, wherein the output end of the light-emitting sided-optical waveguide and the input end of the light-receiving sided-optical waveguide are located on opposite sides of the coordinate input region,
wherein the light-emitting sided-optical waveguide comprises a light-emitting sided-cladding layer, and a light-emitting sided-core embedded in the light-emitting sided-cladding layer, and
the light-receiving sided-optical waveguide comprises a light-receiving sided-cladding layer, and a light-receiving sided core embedded in the light-receiving sided-cladding layer, and
the light-emitting sided-cladding layer has a lower refractive index than the light-emitting sided-core and the light-receiving sided-cladding layer has a lower refractive index than the light-receiving sided-core, and the center height of the light-emitting sided-core is lower than that of the light-emitting sided-optical waveguide and the center height of the light-receiving sided-core is lower than that of the light-receiving sided-optical waveguide, and
the optical touch panel further comprising means for generating a signal to provide input operational feeling using a detection signal received from the light-receiving element as a result of coordinate inputting.

2. The optical touch panel according to claim 1, wherein the light-emitting sided-optical waveguide and a cladding layer of the light-receiving sided-optical waveguide respectively comprises an under-cladding layer; and an over-cladding layer; and at least one of the output end of the over-cladding layer of the light-emitting sided-optical waveguide and the input end of the over-cladding layer of the light-receiving sided-optical waveguide has a lens shape.

3. The optical touch panel according to claim 2, wherein the lens-shaped portion of the output end of the over-cladding layer of the light-emitting sided optical waveguide and the lens-shaped portion of the input end of the over-cladding layer of the light-receiving sided-optical waveguide are each a long lens having a side sectional shape of substantially a quarter of a circle.

4. The optical touch panel according to any one of claim 1 to 3, wherein the signal for providing the input operational feeling is at least one of light, a voice, and vibration.

5. The optical touch panel according to any one of claim 1 to 3, wherein the means for generating a signal comprises means for generating vibration.

6. The optical touch panel according to claim 5, wherein the means for generating a signal is at least one of a vibration motor, a vibration actuator, and a piezo element.

7. An optical touch panel comprising:
a coordinate input region;
a light-emitting element;
a light-emitting sided-optical waveguide connected to the light-emitting element and having an output end; and
a light-receiving sided-optical waveguide having an input end, wherein the output end of the light-emitting sided-optical waveguide and the input end of the light-receiving sided-optical waveguide are located on opposite sides of the coordinate input region,
a light-receiving element connected to the light-receiving sided-optical waveguide, the light-receiving element receiving an optical signal from the light-receiving sided-optical waveguide and generating a detection signal indicating an intensity of the received optical signal;
wherein the light-emitting sided-optical waveguide comprises a light-emitting sided-cladding layer, and a light-emitting sided-core embedded in the light-emitting sided-cladding layer, and
the light-receiving sided-optical waveguide comprises a light-receiving sided-cladding layer, and a light-receiving sided core embedded in the light-receiving sided-cladding layer, and
the light-emitting sided-cladding layer has a lower refractive index than the light-emitting sided-core and the light-receiving sided-cladding layer has a lower refractive index than the light-receiving sided-core, and the center height of the light-emitting sided-core is lower than that of the light-emitting sided-optical waveguide and the center height of the light-receiving sided-core is lower than that of the light-receiving sided-optical waveguide, and
a signal generating device that generates one of sound, light, or vibration in response to the detection signal generated by the light-receiving element as a result of coordinate inputting, the sound, light or vibration providing an input operational feeling to a user.

* * * * *